United States Patent [19]

Ishizaki et al.

[11] Patent Number: 4,677,023
[45] Date of Patent: Jun. 30, 1987

[54] MAGNETIC RECORDING MEDIUM

[75] Inventors: Hideki Ishizaki; Osamu Hasegawa, both of Saku; Masaharu Nishimatsu, Komoro, all of Japan

[73] Assignee: TDK Corporation, Tokyo, Japan

[21] Appl. No.: 739,284

[22] Filed: May 30, 1985

[30] Foreign Application Priority Data

Jun. 6, 1984 [JP]   Japan ................................ 59-114679

[51] Int. Cl.⁴ .............................................. G11B 5/72
[52] U.S. Cl. ..................... 428/323; 427/131; 427/128; 428/329; 428/331; 428/336; 428/694; 428/900; 428/408
[58] Field of Search ............... 428/694, 405, 407, 695, 428/900, 408, 336, 328, 329, 323, 331; 427/131, 128; 360/134-136

[56] References Cited

U.S. PATENT DOCUMENTS

| | | | |
|---|---|---|---|
| 4,309,482 | 1/1982 | Suzuki | 428/69 J |
| 4,425,404 | 1/1984 | Suzuki | 428/69 X |
| 4,443,514 | 4/1984 | Yamamoto | 428/69 J |
| 4,542,071 | 9/1985 | Homola | 428/69 X |

Primary Examiner—Ellis P. Robinson
Attorney, Agent, or Firm—Oblon, Fisher, Spivak, McClelland & Maier

[57] ABSTRACT

A magnetic recording medium comprising a non-magnetic substrate, a ferromagnetic thin film formed on the substrate, and a top coating layer containing a fine particulate pigment, formed on the surface of the ferromagnetic thin film, wherein the top coating layer satisfies the condition of $0.3x < y < 2x$ where x is the average particle size of the fine particulate pigment and y is the thickness of the top coating layer, and the average particle size x is less than 200 Å.

5 Claims, 2 Drawing Figures

MAGNETIC RECORDING MEDIUM

BACKGROUND OF THE INVENTION

1. Field of the Invention

The present invention relates to a magnetic recording medium. More particularly, the present invention relates to a magnetic recording medium in which a ferromagnetic thin film constitutes a magnetic recording layer, whereby clogging and dropouts are minimized and which has excellent running stability and durability.

2. Description of the Prior Art

Recently, magnetic recording media have been widely used in the fields of audio and video recording, computers, magnetic discs, etc. Accordingly, the amount of information to be recorded on magnetic recording media increases year after year, and there is an increasing demand for the improvement of the recording density of magnetic recording media.

A non-binder type magnetic recording medium, i.e. a magnetic recording medium comprising a ferromagnetic thin film, has advantages over a coating type magnetic recoridng medium in that it can readily be made thin and it has great saturation magnetization. Nevertheless, it has some problems in respect of corrosion, impact strength and frictional strength, and is susceptible to abrasion or destruction due to its engagement with the magnetic head in high speed relative movement during the operation such as recording, playing back or erasing of magnetic signals. Namely, the magnetic recording medium with a ferromagnetic thin film formed by electroplating, electroless plating, sputtering, vacuum vapor deposition, ion plating, etc., contains no binder, and accordingly, the magnetic recording layer is likely to be abraded or destructed by friction during the sliding engagement with the magnetic head.

Further, the magnetic recording medium comprising a ferromagnetic thin film is likely to be corroded from its surface, and if the corrosion progresses, the practically desired properties such as head touch or abrasion resistance deteriorate, and the electromagnetic conversion characteristics will be adversely affected.

In order to overcome this difficulty, it has been proposed to apply a lubricant to the surface of the magnetic thin metal film (Japanese Examined patent publication No. 25246/1964). However, in such a method, the lubricating effect does not last as the lubricant is likely to be wiped off by e.g. the magnetic head. Further, such effects as rust-proofing effects or durability can not of course be expected by this method.

Further, as a means to provide a lubricating effect continuously on the magnetic recording layer, it has been proposed to provide a lubricating layer (i.e. a back coating layer) formed on the opposite side of the magnetic recording layer and comprising a liquid or semi-solid lubricant and an organic binder as main components (Japanese Examined patent publication No. 29769/1982). In this method, the lubricant exuding from the rear side surface of the magnetic recording layer transfers to the magnetic recording layer when the magnetic medium is wound in the form of a roll, whereby the lubricant can always be supplied to the surface of the magnetic recording layer, and the durability (resistance against scratching or abrasion) or the dynamic frictional coefficient of the magnetic recording layer are said to be improved. However, in such a method wherein a lubricant is incorporated in the back coating layer without providing a top coating layer on the ferromagnetic thin film, the level of friction between the magnetic thin film and the magnetic head is still high, thus leading to a running failure, and the corrosion resistance or the rust-proofing effect is not adequate.

The present inventors have conducted extensive researches to overcome the above difficulties, and have found and previously proposed that it is possible to obtain a magnetic recording medium having improved running property and durability, by providing a top coating layer comprising specific components on a non-magnetic substrate (Japanese patent application Nos. 15258/1984 and 15259/1984). From a further research, the present inventors have now found that it is possible to obtain an excellent magnetic recording medium having a head cleaning function with minimum clogging, level down and dropouts when the particle size of the fine particulate pigment in the top coating layer and the thickness of the top coating layer are in specified ranges. The present invention has been accomplished on the basis of this discovery.

SUMMARY OF THE INVENTION

Namely, the present invention provides a magnetic recording medium comprising a non-magnetic substrate, a ferromagnetic thin film formed on the substrate, and a top coating layer containing a fine particulate pigment, formed on the surface of the ferromagnetic thin film, wherein the top coating layer satisfies the condition of $0.3x < y < 2x$ where $x$ is the average particle size of the fine particulate pigment and $y$ is the thickness of the top coating layer, and the average particle size $x$ is less than 200 Å.

DETAILED DESCRIPTION OF THE INVENTION

Figure 1:
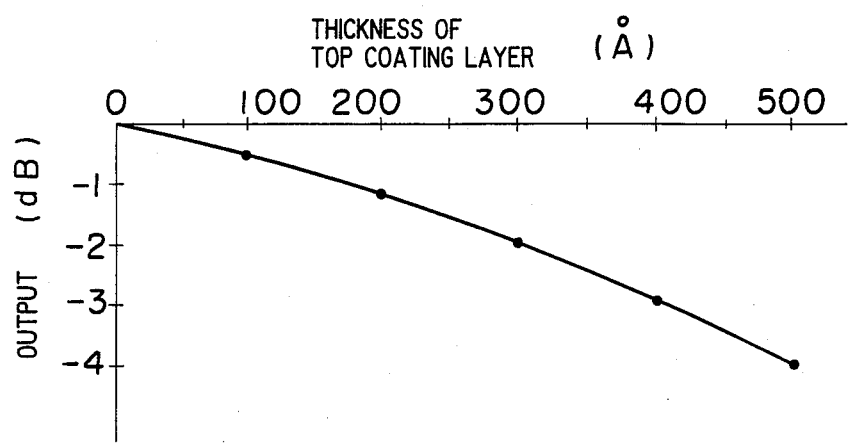
FIG. 1 is a graph illustrating the relation between the thickness of the top coating layer and the output.

By forming a top coating layer on the ferromagnetic thin film, it is possible to obtain a magnetic recording medium having excellent rust-proofing properties, corrosion resistance, durability and running stability. However, when the magnetic recording medium having a top coating layer is used repeatedly, the abraded matters from the top coating layer are likely to deposit and accumulate on the magnetic head, whereby clogging, level down or dropouts are likely to result. This tendency is remarkable particularly in a magnetic recording medium containing no fine particulate pigment. If a fine particulate pigment is incorporated, the fine particulate pigment serves as abrasives and scrapes off the matters deposited on the head, thus cleaning the head, whereby the clogging and level down can be prevented, and dropouts can be reduced.

When the average particle size $x$ of the fine particulate pigment and the thickness $y$ of the top coating layer are within a range of $0.3x < y < 2x$, and the average particle size $x$ is less than 200 Å, the cleaning effect for the head is particularly good, and the deposition on the head can be prevented, whereby the clogging, level down or dropouts can effectively be minimized.

The upper limit of the thickness of the top coating layer was 450 Å from the aspect of the electromagnetic conversion characteristics.

Referring to the above relation, if the top coating layer thickness is less than 0.3x, the output fluctuation increases, and the falling off of the fine particulate pigment increases and the abrasion is likely to be led probably because the fine particulate pigment is not adequately secured to the top coating layer.

On the other hand, if the top coating layer thickness exceeds 2x, the cleaning effect decreases, and the abraded matters from the top coating layer accumulate on the head probably because the fine particulate pigment is not exposed on the surface of the layer.

As the fine particulate pigment to be used in the present invention, there may be mentioned, for instance, $ZrO_2$, $Cr_2O_3$, $Al_2O_3$, $Y_2O_3$, $CeO_2$, $Fe_3O_4$, $Fe_2O_3$, $ZrSiO_4$, $Sb_2O_5$, $SnO_2$ and $TiO_2$. The particle sizes of these fine particulate pigments are less than 200 Å, preferably at most 150 Å.

In the case of $SiO_2$, the fine particulate pigment is available in the form of (1) a colloidal solution of superfine particles of silicic anhydride (Snowtex (trademark), an aqueous system, a methanol silica sol, etc., manufactured by Nissan Chemical Industries, Ltd.) or (2) superfine particulate anhydrous silica (Standard product: 100 Å) produced by burning purified silicon tetrachloride (Aerosil (trademark), manufactured by Nippon Aerosil Co., Ltd.).

Further, it is possible to use super-fine particulate aluminum oxide and titanium oxide which can be produced by a vapour phase method in the same manner as for the above-mentioned colloidal solution of super-fine particles (1) and the super-fine particulate anhydrous silica (2), as well as the above-mentioned fine particulate pigments.

The top coating layer of the present invention may contain an antioxidant, a lubricant, and an organic binder such as a monomer, oligomer or polymer. (The organic binder may not necessarily be incorporated.)

Further, carbon black may be incorporated into the top coating layer to prevent dropout. Such carbon black preferably has a particle size of less than 200 Å.

The fine particulate pigment is incorporated in the top coating layer comprising an antioxidant, a lubricant and an organic binder (the organic binder may be omitted), in an amount of from 15,000 to 1,000,000 particles/100 $\mu m^2$, preferably from 20,000 to 800,000 particles/100 $\mu m^2$.

The ratio of the organic binder to the antioxidant is from 0:100 to 90:10, preferably from 0:100 to 70:30 (by weight). The lubricant is used in an amount of from 0.5 to 300 parts by weight per 100 parts by weight of the organic binder + the antioxidant. Carbon black is used in a ratio of carbon black to the fine particulate pigment of from 1/9 to 8/2, preferably from 1/9 to 5/5.

As the ferromagnetic metal or the ferromagnetic alloy to be used for the ferromagnetic thin film of the present invention there may be mentioned iron, cobalt, nickel, other ferromagnetic metal or a magnetic alloy such as Fe-Co, Fe-Ni, Co-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Nd, Mn-Bi, Mn-Sb, or Mn-Al.

The ferromagnetic thin film is formed on a non-magnetic substrate, i.e. a known substrate e.g. a plastic film such as a polyester film or a polyamide film, a metal plate such as an aluminum plate or a stainless steel plate, or an inorganic plate such as a glass plate, directly or with an interposed non-magnetic thin film layer, by applying the above-mentioned metal or alloy by means of vacuum vapor deposition, sputtering, ion plating, plating or any other method.

The ferromagnetic thin film of the present invention may be the one produced by any one of the above methods. However, rather than the one formed by (1) the vapor deposition in a vacuum of $5.0 \times 10^{-6}$ Torr at an angle of 50° in the direction of the width relative to the evaporation source, as described in Example 5 of the above-mentioned Japanese Examined patent publication No. 29769/1982, it is preferred to use the one obtained by (2) the vapor deposition under $1 \times 10^{-4}$ Torr which is commonly employed and in which the direction of the vapor deposition is inclined in the longitudinal direction (at an angle of 90° to 30°) and the vapor deposition is conducted while supplying $O_2$ or $O_2$ and Ar as the atmosphere.

The vapor deposited film produced by the above method (1) is in the metallic state over the entire surface (except for the portion naturally oxidized upon exposure to the air), whereas in the case of the method (2) wherein a metal or alloy is vapor deposited in vacuum in the presence of a very small amount of oxygen gas, the magnetic metal contains oxygen, and the oxygen is present in the state of an oxide without forming a solid solution with the metal. The presence of this oxide is preferable for the magnetic recording medium. It has been found that good properties in the present invention are obtainable particularly when the oxide is present in a large amount at the interface with the base and at the surface on the opposite side of the base.

For the introduction of oxygen into the ferromagnetic thin metal layer, there may be mentioned, in addition to the above-mentioned vapor deposition in the presence of oxygen, a method wherein a vapor deposited layer formed by a vacuum vapor deposition in the absence of oxygen, is forcibly oxidized, for instance, in an atmosphere at 90° C. under a relative humidity of 20% so that the surface on the opposite side of the base will be composed solely of an oxide. The oxygen content in the oxygen-containing ferromagnetic thin film is from 3 to 60% at (O/magnetic metal)$\times$100.

As the antioxidant to be used for the top coating layer of the present invention, there may be employed any antioxidant so long as it is capable of preventing the oxidation of a metal. The following conventional antioxidants may be employed. Namely, they are structurally classified into (1) phenolic antioxidants, (2) amine antioxidants, (3) phosphorus antioxidants, (4) sulfur antioxidants, (5) organic acid, alcohol or ester antioxidants, (6) quinone antioxidants, and (7) inorganic acid and inorganic salt antioxidants.

Specific Examples of these antioxidants may be mentioned as follows:
(1) As phenolic antioxidants, there may be mentioned 2,6-di-tert-butyl-p-cresol, 2,6-di-tert-butyl-phenol, 2,4-di-methyl-6-tert-butyl-phenol, butylhydroxy anisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetraquis[methylene-3-(3,5-di-tert-butyl-4-hydroxyphenyl)propionate] methane, 1,1,3-tris(2-methyl-4-hydroxybutylphenyl)butane, dibutylhydroxytoluene, propyl gallate, guaiaretic acid, and nordihydroguaiaretic acid. As a radiation curable type, there may be mentioned a methacrylate or acrylate type of monoglycol salicylate, 2,5-di-tert-butylhydroquinone, 2,4-dihydroxybenzophenone, 2,4,5-trihydroxybutyrophenone or hydroquinone.

(2) As amine antioxidants, there may be mentioned phenylβ-naphtylamine, α-naphthylamine, N,N'-di-secondarybutyl-p-phenylenediamine, phenothiazine, N,N'-diphenyl-p-phenylenediamine as well as alkanol amines and phospholipids. The amine antioxidants include radiation curable type such as radiation curable dimethylamino ethylmethacrylate or acrylate.

(3) As phosphorus antioxidants, radiation curable or radiation non-curable type may be employed. R as the phosphoric acid ester moiety includes an alkyl group, an alkyl phenyl group as well as oxidized ethylene and oxidized propylene, and R preferably contains from 1 to 26 carbon atoms, more preferably from 1 to 22 carbon atoms. The phosphoric acid esters include mono-, di- or tri-esters. The antioxidant may contain substantial amount of the mono- or di-component, and the tri-type may be cut. Further, phosphoric acid esters include $NH_4$-type, methacrylate-type and acrylate-type. Specifically, there may be mentioned phosphites such as triphenyl phosphite, trioctadecyl phosphite, tridecyl phophite and trilauryl trithio phosphite; and phosphate such as hexamethyl phosphoric triamide, butylphosphate, cetylphosphate, butoxyethyl phosphate, 2-ethylhexyl phosphate, β-chloroethyl phosphate, butoxyethyl phosphate diethylamine salt, di(2-ethylhexyl)phosphate, ethylene glycol acid phosphate, (2-hydroxyethyl)methacrylate phosphate, butylhydroxymethacrylate phosphate, caprylhydroxymethacrylate phosphate, myristylhydroxymethacrylate phosphate, stearylhydroxymethacrylate phosphate, cetylhydroxymethacrylate phosphate, butylphenylhydroxylmethacrylate phosphate, amylphenylhydroxymethacrylate phosphate and nonylphenylhydroxymethacrylate phosphate as well as acrylate types thereof, phenyl phosphate, and phenyl phosphates of other alcohols and nonylphenyl, and vanadium type acidic phosphoric acid esters.

(4) As sulfur antioxidants, there may be mentioned dilauryl thiodipropionate, distearyl thiodipropionate, laurylstearyl thiodipropionate, dimyristyl thiodipropionate, distearyl β,β'-thiodibutylate, 2-mercaptobenzimidazole, and dilauryl sulfide. They also include radiation curable type such as methacrylates and acrylates of 4,4'-thio-bis(3-methyl-6-tert-butyl-phenol), and 2,2'-thio-bis(4-methyl-6-tert-butyl-phenol). Further, these antioxidants may further contain oxidized ethylene or oxidized propylene.

(5) The organic acid, alcohol or ester antioxidants include sorbitol, glycerine, propylene glycol, adipic acid, citric acid and ascorbic acid, and they may be of radiation curable type.

(6) As quinone antioxidants, there may be mentioned hydroquinone and tocopherol. They may be of radiation curable type.

(7) Phosphoric acid may be mentioned as the representative of the inorganic acid or inorganic salt antioxidants.

Among the above-mentioned antioxidants, it is preferred to employ, with a view to preventing the transfer of the rear side roughness to the ferromagnetic thin film, a radiation curable type having an acrylic double bond in its molecule, such as monoglycol salicylate methacrylate (or acrylate), 4-tert-butylcatechol methacrylate (or acrylate), dimethylaminoethyl methacrylate (or acrylate), ethylhydroxy methacrylate (or acrylate) phosphate, cetylhydroxyphosphate methacrylate (or acrylate), stearyl methacrylate (or acrylate) phosphate, and phenyl types thereof, and 2,2'-thio-bis(4-methyl-6-tert-butyl-phenol) methacrylate (or acrylate). The phosphoric acid esters may be prepared by conventional methods. For instance, there may be mentioned a method disclosed in Japanese Unexamined patent publication No. 44223/1982. When a radiation curable antioxidant is employed, its curing onto the ferromagnetic thin film can be conducted on-line, whereby deterioration of the surface properties due to the transfer of the rear side roughness caused by the tightening of the winding during the thermosetting can be avoided, and there will be no decrease in the output. In addition to the effects on the properties such as the prevention of dropouts and the reduction of the difference in the output as between the inside and outside portions of the rolled medium, it is possible to obtain effects on the process such that the production can be conducted on-line.

As the lubricant to be used, there may be employed e.g. silicone oil, fluorine oil, a fatty acid, a fatty acid ester, a paraffin, a liquid paraffin or a surfactant as a lubricant which has been commonly used for the magnetic recording medium of this type. However, it is preferred to use a fatty acid and/or a fatty acid ester.

As the fatty acid, there may be mentioned a fatty acid having at least 12 carbon atoms (RCOOH where R is an alkyl group having at least 11 carbon atoms) such as caprylic acid, capric acid, lauric acid, myristic acid, palmitic acid, stearic acid, behenic acid, oleic acid, elaidic acid, linolic acid, linolenic acid or stearolic acid. As the fatty acid ester, there may be employed a fatty acid ester of a monobasic fatty acid having from 12 to 16 carbon atoms with a monohydric alcohol having from 3 to 12 carbon atoms or a fatty acid ester of a monobasic fatty acid having at least 17 carbon atoms with a monohydric alcohol having carbon atoms in a total of from 21 to 23 as added with the number of carbon atoms of the fatty acid.

As the silicone, there may be employed a fatty acid-modified silicone or a partially fluorinated silicone may be employed. As the alcohol, there may be employed a higher alcohol. As the fluorine oil, there may be employed those produced by electrolytic substitution, telomerization or oligomerization.

Among the lubricants, radiation curable type lubricants may be advantageously employed to prevent the transfer of the roughness of the rear side to the ferromagnetic thin layer or to reduce dropouts or the difference in the output as between the outside and the inside of the roll of a rolled tape, and to make the production on-line possible. Such radiation curable lubricants include compounds containing in their molecules molecular chains exhibiting lubricating properties and acrylic double bonds, such as acrylates, methacrylates, vinyl acetates, acrylic acid amide compounds, vinyl alcohol esters, methyl vinyl alcohol esters, allyl alcohol esters and glycerides. These lubricants may be represented by the following structural formulas:

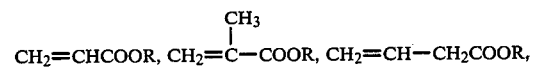

-continued

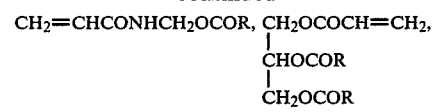

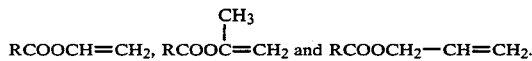

In the above formulas, R is a straight chain or branched, saturated or unsaturated hydrocarbon group having at least 7 carbon atoms, preferably from 12 to 23 carbon atoms, which may be substituted by fluorine. As the fluorinated substituents, there may be mentioned $C_nF_{2n+1}-$, $C_nF_{2n+1}(CH_2)_m-$ (where m=1—5), $$C_nF_{2n+1}SO_2\overset{R}{N}CH_2CH_2-,\ C_nH_{2n+1}CH_2CH_2NHCH_2CH_2-,$$

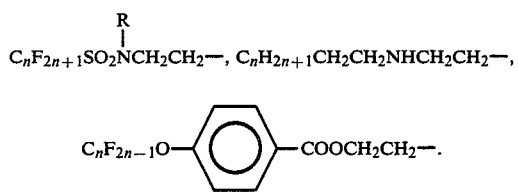

Preferred specific examples of such radiation curable lubricants include stearic acid methacrylate or acrylate, methacrylate or acrylate of stearyl alcohol, methacrylate or acrylate of glycerin, methacrylate or acrylate of glycol, and methacrylate or acrylate of silicone.

As the organic binder which may be employed for the top coating layer of the present invention, there may be mentioned a polymer, a monomer and an oligomer.

As the polymer, there may be employed thermoplastic resins, thermosetting resins or reactive resins, or mixtures thereof, which are commonly used for the magnetic recording media. However, from the viewpoint of the strength of the formed coating layer, a curable type resin, particularly radiation curable resin is preferred.

As the thermoplastic resins, there may be employed those having a softening point of at most 150° C., an average molecular weight of from 10,000 to 200,000 and a degree of polymerization of from about 200 to 2,000. For instance, there may be mentioned a vinyl chloride-vinyl acetate copolymer (including the one containing a carboxylic acid), a vinyl chloride-vinyl acetate-vinyl alcohol copolymer (including the one containing a carboxylic acid), a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a nylon-silicone resin, a nitrocellulose-polyamide resin, a polyvinyl fluoride, a vinylidene chloride-acrylonitrile copolymer, a butadiene-acrylonitrile copolymer, a polyamide resin, a polyvinylbutyral, a cellulose derivative (such as cellulose acetate, cellulose diacetate, cellulose triacetate, cellulose propionate or nitrocellulose), a styrene-butadiene copolymer, a polyester resin, a chlorovinyl ether-acrylate copolymer, an amino resin, a synthetic rubber-type thermoplastic resin, or a mixture thereof.

As the thermosetting resins or reactive resins, there may be employed those which have a molecular weight of at most 200,000 in the state of the coating solutions and which undergo, when heated after being applied and dried, a condensation or addition reaction to have an unlimited molecular weight. Among these resins, those which do not soften or melt until the thermal decomposition, are preferred. Specifically, there may be mentioned, for instance, a phenol resin, an epoxy resin, a polyurethane thermosetting resin, a urea resin, a melamine resin, an alkyd resin, a silicone resin, an acrylic reactive resin, an epoxy-polyamide resin, a nitrocellulose melamine resin, a mixture of a high molecular weight polyester resin with an isocyanate prepolymer, a mixture of methacrylate copolymer with a diisocyanate prepolymer, a mixture of a polyester polyol with a polyisocyanate, a urea formaldehyde resin, a mixture of a low molecular weight glycol/a high molecular weight diol/triphenylmethane triisocyanate, a polyamine resin or a mixture thereof.

Particularly preferred is a thermosetting resin which is a combination of a cellulose resin (e.g. nitrocellulose), a vinyl chloride-vinyl acetate-vinyl alcohol copolymer and urethane (wherein a curing agent is used), or a radiation curable resin which is composed of a vinyl chloride-vinyl acetate-vinyl alcohol copolymer (including the one containing a carboxylic acid) or an acryl-modified vinyl chloride-vinyl acetate-vinyl alcohol copolymer (including the one containing a carboxylic acid) and a urethane acrylate. As the radiation curable resin, there may be employed, in addition to the above-mentioned preferred combination, a thermoplastic resin which contains in its molecule or is incorporated with radiation curable or polymerizable groups such as acrylic double bonds of acrylic acid, methacrylic acid or their ester compounds containing unsaturated double bonds having radical polymerizability, allyl-type double bonds of e.g. diallyl phthalate, or unsaturated bonds of e.g. maleic acid or a maleic acid derivative. As other useful binder components, there may be mentioned acrylic acid, methacrylic acid and acrylamide as monomers. A binder containing double bonds may also be obtained by modifying various polyesters, polyols, polyurethanes or the like with a compound having an acrylic double bond. Further, it is also possible to obtain resins having various molecular weights by incorporating a polyhydric alcohol and a polybasic carboxylic acid, as the case requires. The above-mentioned specific examples are only a part of useful radiation sensitive resins, and they may be used in combination as a mixture.

As the above-mentioned radiation curable monomer, radiation curable oligomer and radiation curable polymer, there may be employed ionization energy sensitive monomers, oligomers and polymers which contain in their molecules radiation curable or polymerizable groups such as acrylic double bonds of acrylic acid, methacrylic acid or their ester compounds containing unsaturated double bonds having radical polymerizability, allyl-type double bonds of e.g. diallyl phthalate, or unsaturated bonds of e.g. maleic acid or a maleic acid derivative.

As the radiation curable monomer, there may be employed a compound having a molecular weight of less than 2,000. Likewise, as the radiation curable oligomer, there may be employed a compound having a molecular weight of from 2,000 to 10,000. As such monomer and oligomer, there may be mentioned styrene, ethyl acrylate, ethylene glycol diacrylate, ethylene glycol dimethacrylate, diethylene glycol diacrylate, diethylene glycol dimethacrylate, 1,6-hexane glycol diacrylate, 1,6-hexane glycol dimethacrylate, etc. Particularly preferred are N-vinyl pyrrolidone, pentaerythritol tetraacrylate (or methacrylate), pentaerythritol triacrylate (or methacrylate), trimethylol propane triacrylate (or methacrylate), trimethyl propane diacrylate (or methacrylate), a multifunctional oligoester acrylate (Acronix M-7100, M-5400, 5500, 5700, etc. manufactured by Toa Gosei Chemical Industries Co. Ltd.), an acryl-modified urethane elastomer (Nippolan 4040), or such monomers to which functional groups such as —COOH, are introduced, an acrylate (or methacrylate) of a phenol ethylene oxide adduct, or compounds of the following formula in which a pentaerythritol condensed ring is substituted by an acryl radical (or a methacryl radical) or an ε-caprolactone-acryl radical:

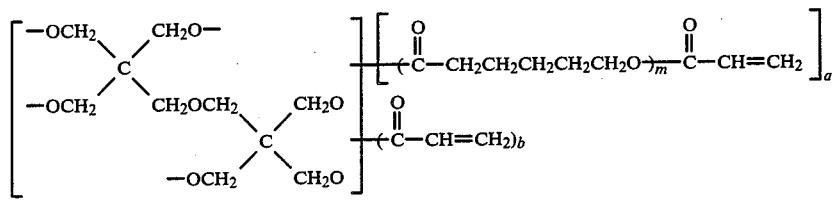

i.e. a compound wherein m=1, a=2 and b=4 (which will be hereinafter referred to as "special pentaerythritol condensation product A"), a compound wherein m=1, a=3 and b=3 (which will be hereinafter referred to as "special pebtaerythritol condensation product B"), a compound wherein m=1, a=6 and b=0 (which is hereinafter referred to as "special pentaerythritol condensation product C"), a compound wherein m=2, a=6 and b=0 (which will be hereinafter referred to as "special pentaerythritol condensation product D"), and special acrylates represented by the following formulas:

$(CH_2=CHCOOCH_2)_3—CCH_2OH$     (1)
(Special Acrylate A)

$(CH_2=CHCOOCH_2)_3—CCH_2CH_3$     (2)
(Special Acrylate B)

$[CH_2=CHCO(OC_3H_6)_n—OCH_2]_3—CCH_2CH_3$     (3)
(n ≈ 3)    (Special Acrylate C)

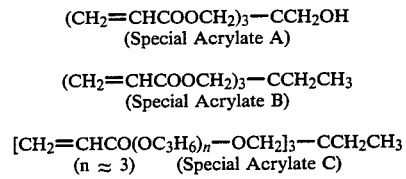
(Special Acrylate D)

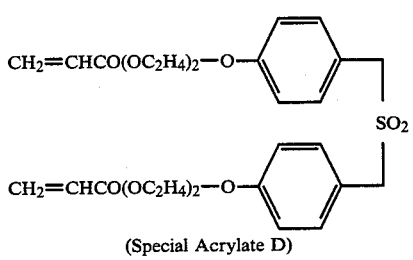
(Special Acrylate E)

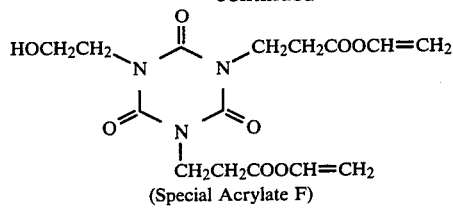
(Special Acrylate F)

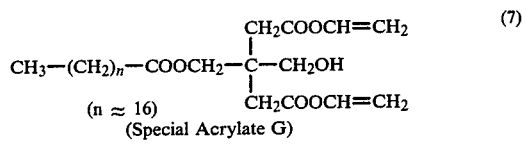
(Special Acrylate G)

$CH_2=CHCOO—(CH_2CH_2O)_4—COCH=CH_2$    (8)
(Special Acrylate H)

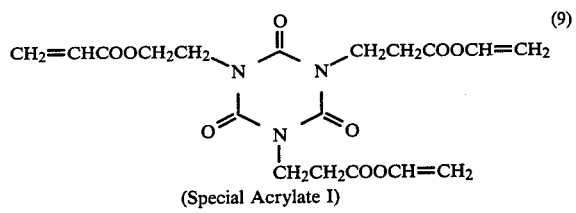
(Special Acrylate I)

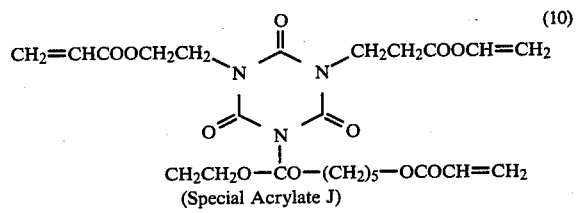
(Special Acrylate J)

$$A—(X—Y)_n X—A \quad (11)$$
A: acrylic acid, X: polyhydric alcohol, Y: polybasic acid
(Special Acrylate K)

Further, as a radiation curable oligomer, there may be mentioned a polyfunctional oligoester acrylate represented by the following formula, or an acryl modified urethane elastomer, or such oligomers to which functional groups such as —COOH, are introduced:

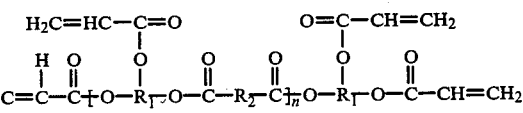

where $R_1$, $R_2$: an alkyl group, and n: an integer.

By using an organic binder, the top coating layer is reinforced by the binder, and the breaking strength of the coating layer increases, whereby the coating layer is strengthened, and the durability of the top coating layer for a high temperature running operation can be improved. Thus, it is possible to obtain a magnetic recording medium having minimum dropouts, free from tightening in the rolled state during the curing operation and having uniform properties in the longitudinal direction. Further, by using a radiation curable binder, continuous treatment for the production of the top coating layer is possible and can be conducted on-line, thus contributing to energy saving and cost saving.

As a method for providing a top coating layer comprising the fine particulate pigment, the antioxidant, the lubricant and, if necessary, an organic binder, on the surface of the ferromagnetic thin film, there may be employed a method wherein the above additives are diluted with a solvent and applied onto the ferromagnetic thin metal film to form a thin layer or such additives are mixed with a binder and then applied onto the thin film to form a thin layer, or a method wherein the above additives are vaporized in air, in an inert gas or in vacuum, and their vapors are brought in contact with the ferromagnetic metal surface.

In the case where a radiation curable type additive is used for the top coating layer of the present invention, as the active energy rays to be used for the crosslinking thereof, there may be employed electron beams generated from a radiation accelerator as the source of radiation, $\gamma$-rays generated from $Co^{60}$ as the source of radiation, $\beta$-rays generated from $Sr^{90}$ as the source of radiation, or X-rays generated from X-ray generator as the source of radiation, or ultraviolet rays.

From the viewpoints of the easy control of the absorption dose, the introduction to the production line, or the shielding of ionized radiation, it is particularly advantageous to use the radiation rays from the radiation accelerator as the source of radiation.

As the carbon black to be used for the top coating layer of the present invention, there may be employed any carbon black produced by any one of conventional methods, such as furnace, channel, acetylene, thermal or lamp. However, acetylene black, furnace black, channel black, roller and disc black and German naphthalene black are preferred. The particle size of the carbon black to be used in the present invention is preferably less than 200 Å, as measured by an electron microscopic photography.

In the present invention, a back coating layer is not essential. However, it is preferred to provide a back coating layer since the running properties will thereby be further stabilized. The back coating layer contains an inorganic pigment, a lubricant and an organic binder which are commonly employed.

As described in the foregoing, in the present invention, the top coating layer formed on the ferromagnetic thin film is a top coating layer containing a fine particulate pigment having an average particle size x of less than 200 Å and satisfying the condition of $0.3x < y < 2x$ where x is the average particle size of the fine particulate pigment and y is the thickness of the top coating layer, whereby in addition to the excellent rust-proofing effect, corrosion resistance, durability and running stability attributable to the provision of the top coating layer, it is possible to obtain excellent effects such that (1) no clogging takes place, (2) the level down is minimum, and (3) dropouts are minimum.

The magnetic recording medium of the present invention is useful as an audio tape, a video tape, a computer tape, an endless tape or a magnetic disc. Among such uses, it is particular useful as a video tape and a computer tape, wherein the dropouts are one of the most critical properties.

By using a magnetic recording layer comprising a thin metal film provided with a fine particulate pigment-containing top coating layer of the present invention, it is possible to obtain a high performance tape having excellent electromagnetic conversion characteristics and property dependability for a highly biased audio cassette tape for HiFi and a video cassette tape, particularly a 8 mm video cassette tape and a master tape for contact transfer printing of a video tape, in which technical progress is particularly remarkable in recent years, and which enjoy an expansion of marketability. Thus, the magnetic recording medium of the present invention is excellent and very useful.

Now, the present invention will be described in detail with reference to Examples. However, it should be understood that the present invention is by no means restricted by these specific Examples.

EXAMPLE 1

(1) Formation of a magnetic layer

Ferromagnetic thin film 1

A polyester film having a thickness of 12 μm was moved along the circumferential surface of a cylindrical cooling can, and an alloy comprising 80% of Co and 20% of Ni was melted and obliquely vapor deposited only at a portion having an angle of incidence of from 90° to 30°, in a chamber kept under a vacuum degree of $1.0 \times 10^{-4}$ Torr while circulating $O_2 + Ar$ (a volume ratio of 1:1) at a rate of 800 cc/min, whereby a Co-Ni-O thin film having a thickness of 0.15 μm was formed. Oxygen was localized at the interface with the base and at the surface on the opposite side of the base. The surface on the opposite side of the base was covered substantially solely by the oxide. Hc=1000Oe. The average oxygen content in the thin film was 40% as the atomic ratio relative to Co and Ni (OCoNi×100).

Ferromagnetic thin film 2

A polyester film having a thickness of 12 μm was moved along the circumferential surface of a cylindrical cooling can, and vapor deposition was conducted in the same manner as in the case of ferromagnetic thin film 1, in a chamber having a vacuum degree of $5.0 \times 10^{-6}$ Torr. The film thus formed had a thickness of 0.15 μm and consists substantially of Co-Ni.

This tape was forcibly oxidized in an atmosphere at 90° C. under relative humidity of 20%. The surface on the opposite side of the base was with the oxide. Hc=900Oe. The average oxygen content in the thin film was 45% as the atomic ratio relation to Co and Ni.

(2) Formation of a top coating layer

Top coating compositions

|  | Part by weight |
|---|---|
| Top coating composition 1 | |
| Dimethylaminoethyl methacrylate | 0.5 k |
| Colloidal $SiO_2$, 50Å | 0.0 1 |
| Fluorine-modified silicon stearate | 0.4 k |
| MEK | 100 |
| Top coating composition 2 | |
| Stearyl (2) hydroxy acrylate phosphate (a mixture of mono and di) | 1 |
| $SiO_2$ (Colloidal - prepared by method (1)) 100Å | 0.04 |

-continued

| | Part by weight |
|---|---|
| Stearic acid acrylate | 0.5 |
| Myristyl myristilate | 0.1 |
| MEK/toluene (1/1) | 100 |
| Top coating composition 3 | |
| Monoglycol salicylate acrylate | 1 |
| TiO$_2$ (Colloidal - prepared by method (1)) 200Å | 0.001 |
| Myristic acid | 0.2 |
| Toluene | 100 |
| Top coating composition 4 | |
| Stearyl (2) hydroxy acrylate phosphate (a mixture of mono and di) | 1.5 |
| Phenoxy-modified product, Molecular weight 30,000 | 0.2 |
| Acryl-modified polyurethane elastomer Molecular weight 4,000 | 0.1 |
| Polyfunctional acrylate Molecular weight 500 | 0.1 |
| Stearic acid acrylate | 1 |
| Cr$_2$O$_3$ (vapor phase method similar to method (2)) 200Å | 0.01 |
| MEK/toluene (1/1) | 100 |

1. Preparation of a top coating layer 1

(A) The top coating 1 was applied onto the ferromagnetic thin film 1, whereby in the top coating composition 1, the particla size of colloidal SiO$_2$ was 50 Å, and k was varied to change the thickness of the top coating layer. From the analysis by an electron microscope, 200,000 particles/100 μm$^2$ were observed.

| | | |
|---|---|---|
| (a) k = | 0.2 | Y = 10Å |
| (b) | 0.4 | 20Å |
| (c) | 1.0 | 50Å |
| (d) | 1.8 | 90Å |
| (e) | 2.5 | 120Å |

The electron beam accelerator was operated at a voltage of 150 KeV at 10 mA at 5 Mrad in nitrogen gas.

The properties of the respective magnetic recording media thus obtained are shown in Table 1. For the measurement of the properties, a VHS deck was modified and operated under such conditions that the head height was 20 μm and the back tension was 20 g so that cloggings and dropouts were likely to result.

TABLE 1

| | a | b | c | d | e | * |
|---|---|---|---|---|---|---|
| After 50 runs at 20° C. under a relative humidity of 60% | | | | | | |
| Clogging | Substantial | None | None | Slight | Substantial | Substantial |
| Deposition on the head | " | " | " | " | " | " |
| Output fluctuations | " | Small | Small | Small | " | " |
| T.C abrasion | " | Slight | Slight | " | " | " |
| D.O. | 1000 | 80 | 80 | 100 | 1000 | 3000 |

T.C. abrasion: Top coat abrasion
D.O.: Dropouts (number/min)
*SiO$_2$ Nil

As is evident from the above Table, those which satisfy the condition of 0.3x (SiO$_2$)<y<2x, was free from clogging and deposition on the head, and the output fluctuations were small. This is believed attributable to the fine particulate pigment incorporated in the top coating layer in that the fine particulate pigment provides cleaning effects for the head whereby the foreign matters deposited on the head are scraped off. The top coating layer itself is reinforced by the incorporated fine particulate pigment. Accordingly, the top coating layer itself is hardly susceptible to scratching, whereby the top coat abrasion and dropouts are minimum.

On the other hand, those which are outside the range of 0.3x (SiO$_2$)<y<2x, were not different from the one containing no SiO$_2$. This indicates that if the top coating material is too small, SiO$_2$ is hardly secured to the vapor deposited film, whereby SiO$_2$ is likely to fall off. On the other hand, if the top coating material is too much, the effects of SiO$_2$ will not be obtained, whereby the top coat abrasion is likely to take place.

(B) FIG. 1 shows the output [RF(5 MHz)] in the case where with the top coating composition 1, the particle size of colloidal SiO$_2$ was 150 Å and the layer thickness was varied.

From this Figure, it was confirmed that those having a layer thickness of not more than 450 Å had a reduction in the output within 3.5 dB and thus are acceptable from the viewpoint of the electromagnetic conversion characteristics.

Figure 2:
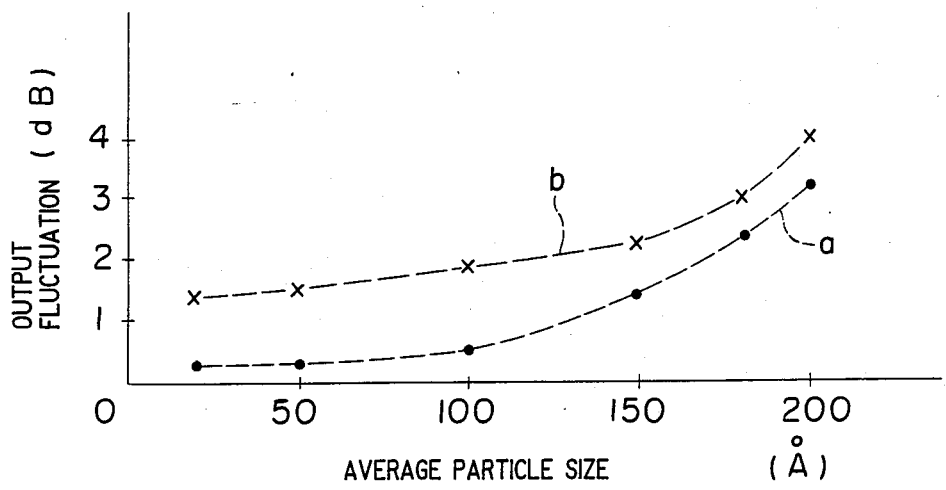
FIG. 2 is a graph illustrating the relation between the average particle size of the fine particulate pigment and the change in the output with respect to two levels of the top coat layer thickness.

(C) FIG. 2 shows the relation between the particle size of the colloidal SiO$_2$ and the output fluctuations with respect to the layer thickness of 75 Å and 200 Å. In the Figure, a represents the layer thickness of 75 Å, and b represents a layer thickness of 200 Å.

As is evident from FIG. 2, the one having an average particle size of 200 Å shows output fluctuations exceeding 3 dB, which substantially affect the reproduced image. On the other hand, those having an average particle size of less than 200 Å showed no substantial influence over the reproduced image.

From the Experiments (B) and (C), colloidal SiO$_2$ should have a particle size of less than 200 Å, preferably not more than 150 Å.

(D) Under the conditions as disclosed in Table 1 (a)-(c), an experiment was conducted by changing the amount of SiO$_2$.

Those having a SiO$_2$ content of not higher than 15,000 particles/100 μm$^2$ did not show adequate cleaning effects for the head, and clogging, deposition on the head, substantial output fluctuations, top coat abrasion and dropouts were observed, thus showing no desirable effects.

When the SiO$_2$ content exceeds 1,000,000 particles/100 μm$^2$, the output fluctuations became substantial, and the falling off from the top coating layer increased, and the abrasion of the top coating layer was substantial.

From the foregoing, SiO$_2$ was preferably present in an amount of from 15,000 to 1,000,000 particles/100 μm$^2$, more preferably from 20,000 to 800,000 particles/100 μm$^2$.

2. Preparation of a top coating layer 2

The top coating composition 2 was applied onto the ferromagnetic thin film 2, and electron beams were irradiated at 150 KeV at 8 mA at a dose of 4 Mrad in nitrogen gas, to form a top coating layer having a thickness of 100 Å. The content of the fine particulate pigment was 140,000 particles/100 μm².

3. Preparation of a top coating layer 3

The top coating composition 3 was applied to the ferromagnetic thin film 2, and electron beams were irradiated at 150 KeV at 8 mA at a dose of 4 Mrad in nitrogen gas, to form a top coating layer having a thickness of 100 Å. The content of the fine particulate pigment was 20,000 partciles/100 82 m².

4. Preparation of a top coating layer 4

The top coating composition 4 was applied onto the ferromagnetic thin film 3, and electron beams were irradiated at 150 KeV at 10 mA at a dose of 5 Mrad in nitrogen gas, to form a top coating layer having a thickness of 200 Å. The content of the fine particulate pigment was 200,000 particles/100 μm².

COMPARATIVE EXAMPLES 2', 3' and 4'

Comparative Examples 2', 3' and 4' correspond to the top coating layers 2, 3 and 4 except that no fine particulate pigment was incorporated.

The properties of the magnetic recording media thus obtained are shown in Table 2.

TABLE 2

| Top coating layer | 2 | 3 | 4 | 2' | 3' | 4' |
|---|---|---|---|---|---|---|
| After 50 runs at 20° C. under a relative humidity of 60% | | | | | | |
| Clogging | None | None | None | Substantial | Substantial | Substantial |
| Depositon on the head | " | " | " | " | " | " |
| Output fluctuations | Small | Small | Small | " | " | " |
| T.C. abrasion | | | | " | " | " |
| D.O. | 80 | 100 | 100 | 3000 | 5000 | 4000 |

T.C. abrasion: Top coat abrasion
D.O.: Dropouts (number/min)

As is evident from Table 2, those incorporated with the fine particulate pigment showed good results with respect to clogging, deposition on the head, output fluctuations, abrasion of the top coating layer and dropouts.

With those containing no fine particulate pigment, no satisfactory results were obtained.

The one wherein 0.01 part by weight of carbon black (200 Å) was incorporated in the above top coating layer 4, showed a reduction of dropouts by 50, thus showing the effectiveness of the addition of carbon black.

Further, similar effects were obtained also in the cases wherein fine particulate pigments other than SiO₂, TiO₂ and Cr₂O₃ were used for the top coating composition.

The molecular weights of the polymers and oligomers used for the top coating layers of the present invention, are number average molecular weights obtained by the following measuring method.

Measurement of an average molecular weight of a binder by GPC

GPC (Gel Permeation Chromatography) is a method of separating molecules in a test sample depending upon their sizes in a mobile phase, wherein a porous gel functioning as a molecular sieve is filled in a column whereby liquid chromatography is conducted. For the calculation of an average molecular weight, a polystyrene having a known molecular weight is used as a standard sample, and a calibration curve is prepared based on its eluting time. An average molecular weight calculated as polystyrene is thereby obtained.

$$Mn = \frac{\Sigma NiMi}{\Sigma Ni}$$

where Mn is a number average molecular weight, and Ni is a number of molecules having a molecular weight of Mi in a given polymer substance.

The above-mentioned various characteristics were measured or evaluated as follows:

1. Clogging

A VHS deck was modified and adjusted to a condition where clogging is likely to result, i.e. with a head height of 20 μm and a back tension of 20 g, and the measurement was conducted at 20° C. under a relative humidity of 60% for 90 minutes.

2. Dropouts

A VHS deck was modified and adjusted to a condition where dropouts are likely to result. A single signal 5 MHz was recorded and reproduced at 20° C. under a relative humidity of 60%, whereby a number of samples wherein reproduced signal lowers by at 18 dB from the average reproduced level for at least 15 micro seconds, were counted with respect to 10 samples for 1 minute each, and the average number was taken as dropouts.

3. Output fluctuations

The output fluctuations were also measured at the time of measuring the dropouts under item 2.

4. Deposition to the head, and top coat abrasion

A VHS deck was modified as mentioned above and operated for 50 runs at 20° C. under a relative humidity of 60%, whereby the deposition to the head and the top coat abrasion were examined by a microscopic photograph.

5. Average particle size and number of particles (a) The average particle size of the fine particulate pigment contained in the top coating layer was assumed, and 10 separate portions were examined with respect to a visual field of 100 μm². In some cases particles were coagulated, and if the variation was substantial, the particle sizes of the primary particles were counted.

(b) Number of particles

Ten separate portions were examined with respect to a visual field of 100 μm², and the average number per 100 μm² was obtained.

What is claimed is:

1. A magnetic recording medium comprising a nonmagnetic substrate, a ferromagnetic metal or metal alloy thin film formed on the substrate, and a top coating layer contained a fine particulate pigment, formed on the surface of the ferromagnetic thin film, the opposite surface of said top coating layer being exposed, wherein the top coating layer satisifies the condition of $0.3x < y < 2x$ where is the average particle size of the particlate pigment and y is the thickness of the top coating layer, and the average particle size x is less than 200 Å.

2. The magnetic recording medium according to claim 1, wherein the top coating layer has a thickness of not greater than 450 Å.

3. The magnetic recording medium according to claim 1, wherein the fine particulate pigment is selected from the group consisting of $ZrO_2$, $Cr_2O_3$, $Al_2O_3$, $Y_2O_3$, $CeO_2$, $Fe_3O_4$, $Fe_2O_3$, $ZrSiO_4$, $Sb_2O_5$, $SnO_2$ and $TiO_2$.

4. The magnetic recording medium according to claim 1, wherein the average particle size of the fine particulate pigment is not larger than 150 Å.

5. The magnetic recording medium according to claim 1, wherein the top coating layer contains carbon black in a weight ratio of carbon black to fine particulate pigment of from 1/9 to 8/2.

* * * * *